Feb. 29, 1944.    A. G. LOOFBOURROW    2,342,949
POWER TRANSMISSION
Filed April 25, 1941

INVENTOR
Alan G. Loofbourrow.
BY
ATTORNEYS.

Patented Feb. 29, 1944

2,342,949

UNITED STATES PATENT OFFICE 2,342,949

POWER TRANSMISSION

Alan G. Loofbourrow, Detroit, Mich., assignor to Chrysler Corporation, Highland Park, Mich., a corporation of Delaware Application April 25, 1941, Serial No. 390,219

6 Claims. (Cl. 74—333)

This invention relates to power transmissions and more particularly to an improved driving system for a motor vehicle.

An object of the invention is the provision of a mechanism of the foregoing characterized by the improved design and operation of the speed ratio drive control means and particularly to provide an improved relationship of the gearing and clutch means constituting the speed ratio drive control means.

Another object of the invention is the provision of a simple and compact arrangement of speed ratio drive control means such that the same can be accommodated in a relatively small space.

A still further object of the invention is the provision of an improved arrangement and relationship of gearing and clutch means to provide for greater flexibility of vehicle control; and more particularly to provide an arrangement including an emergency low speed ratio drive and a reverse drive ratio, in conjunction with a relatively higher speed ratio drive designed for use in normal starting of the vehicle. Such an arrangement is characterized by quietness of operation and the provision of a favorable reverse ratio independently of the emergency low speed ratio.

In carrying out the foregoing objects the transmission includes an arrangement of gearing and clutch means for providing a direct drive between torque input and output members and countershaft gearing in constant mesh with the aforesaid gearing whereby lower speed ratio drives are provided, together with means such as a free-wheeling clutch for example, to accommodate overrunning action of the countershaft gearing during operation of the direct drive.

An illustrated embodiment of the invention is shown in the accompanying drawing, in which.

Figure 1:
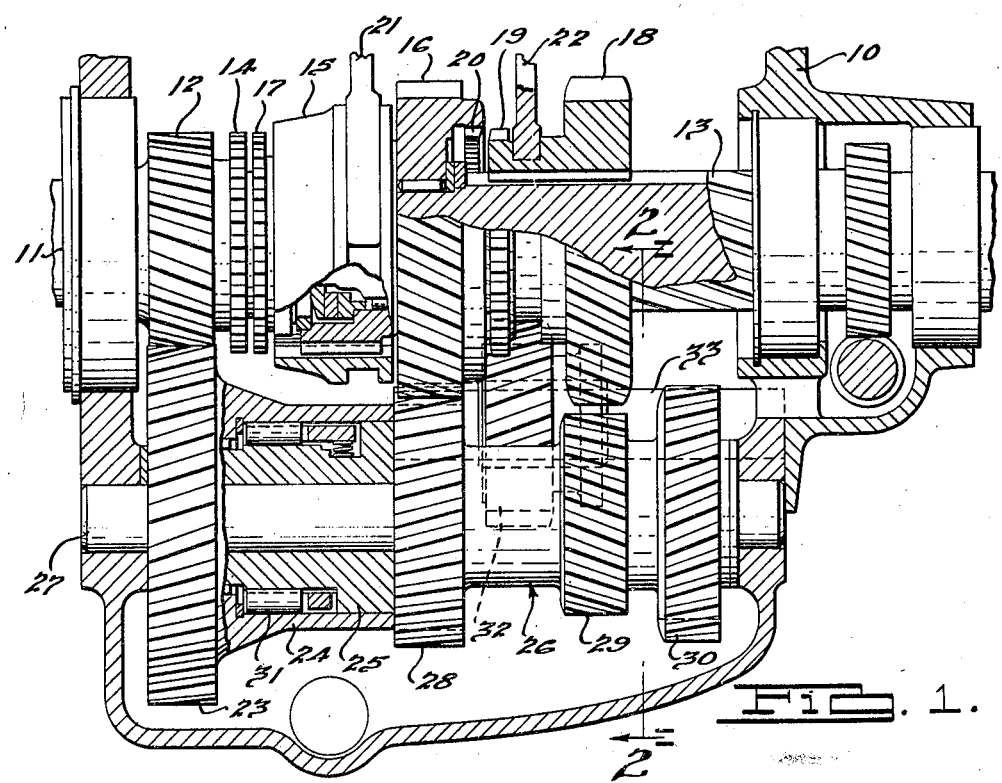
Fig. 1 is a sectional elevational view of a transmission embodying the invention.
Figure 2:
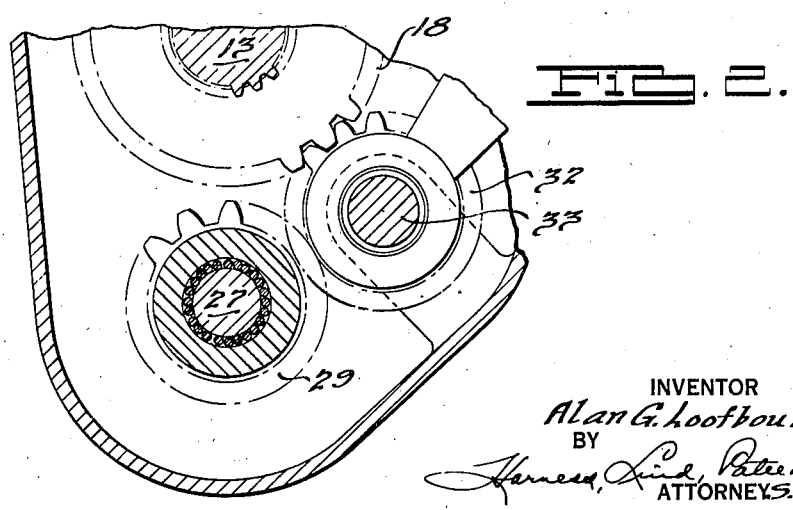
Fig. 2 is a fragmentary elevational view taken as indicated by the line 2—2 of Fig. 1.

Referring to the drawing, the numeral 10 designates a transmission housing having an opening in the forwardly disposed wall receiving the torque input shaft 11 which drivingly carries the main drive pinion or gear 12 in which the forward end portion of the torque output shaft 13 is suitably journalled. Driven with the pinion 12 is a set of clutch teeth 14 adapted to mesh with a sleeve 15 splined on the gear 16 for axial shift, a blocker member 17 preventing clutching engagement of the sleeve 15 with teeth 14 until the speeds of rotation thereof are approximately synchronized. The gear 16 is journalled on the shaft 13 and suitably maintained against axial movement.

Splined on the torque output shaft 13 is a gear 18 having a set of clutch teeth 19 adapted to clutch with a set of clutch teeth 20, driven with the gear 16, in response to axial shift of the gear 18 to the left as viewed in Fig. 1. The sleeve 15 is shifted by a yoke 21 while the gear 18 is shifted by a yoke 22. It will be understood that when the sleeve is clutched with the teeth 14 and the sets of teeth 19 and 20 are clutched there is provided a direct drive between the shafts 11 and 13.

In constant mesh with the main drive pinion or gear 12 is a countershaft gear 23 having an axial sleeve 24, telescoping a corresponding sleeve 25 of a cluster gear, generally indicated at 26, the latter being mounted on a countershaft 27. The cluster gear 26 includes the gear 28 in constant mesh with the gear 16 and gears 29 and 30. The gear 23 is operatively connected with the cluster gear 26 by a free-wheeling clutch 31 which is operable to drive from the gear 23 to the cluster gear 26 and to accommodate overrunning of the latter with respect to the former as will be hereinafter apparent from the description of operation.

A reverse idler 32 is rotatably mounted on a shaft 33 and is shiftable axially thereon to mesh with the gear 29 at the same time meshing with the gear 18 drivingly carried by the torque output shaft 13, the idler 32 meshing with the gears 18 and 29 only when shifted axially to the right, as viewed in Fig. 1, to establish the reverse drive. This arrangement contributes to quietness of operation inasmuch as the reverse idler is rotated and meshed with the associated gears during reverse drive only.

An emergency low speed ratio drive is had by shifting the output gear 18 axially to the right, as viewed in Fig. 1, to mesh with the countershift gear 30. In this manner favorable reverse and emergency low ratios are provided.

During operation of the direct drive as heretofore described, the clutch 31 accommodates overrunning of the cluster gear 26 with respect to the gear 23. When the parts are in the neutral position as illustrated, the drive from the shaft 11 is transmitted from the main drive pinion 12 to the gear 23, and through the clutch 31 to the cluster gear 26. The lower speed drive is obtained by shifting the gear 18 to the right as viewed in Fig. 1 to mesh with the gear 30. With the parts in their illustrated positions, the reverse drive is obtained by shifting the idler 32 to the right as viewed in Fig. 1 to mesh with the gears 18 and 29. Third or high is obtained by shift of the gear 18 from the position shown to clutch the sets of teeth 19 and 20 whereupon the drive passing from the pinion 12 as aforesaid to the cluster gear 26 and from the latter, through the gear 28, to the gear 16 and through the teeth 19, 20 to gear 18.

I claim:

1. In a power transmitting mechanism including a torque input gear and a driving gear coaxial therewith, sets of clutch teeth respectively driven with said gears, a sleeve driven with said driven gear and shiftable axially to clutch with the set of clutch teeth driven with said input gear; countershaft gearing including a first gear in constant mesh with said input gear, a second gear in constant mesh with said driven gear, and third and fourth gears driven from said second gear, a clutch between said first and second gears accommodating relative rotation thereof when said sleeve is clutched with said set of clutch teeth as aforesaid; a torque output shaft, an axially shiftable gear driven with said shaft, a set of clutch teeth driven with the last mentioned gear adapted to clutch with the set of clutch teeth driven with said driven gear in response to shift of said axially shiftable gear in one direction, said axially shiftable gear being shiftable in another direction to mesh with said countershaft fourth gear; and a reverse idler shiftable axially to operably connect said countershaft third gear and said axially shiftable gear when the latter and said fourth gear are demeshed.

2. In a power transmitting mechanism, including a torque input driver and a torque output shaft, coaxial gears, one axially stationary and the other drivingly mounted on said shaft for axial shift, sets of clutch teeth respectively driven with said coaxial gears adapted for clutching engagement in response to axial shift of said shiftable gear, a countershaft gear in constant mesh with said stationary gear, means operable to establish a direct drive between said input member and said stationary gear, driven means including a one way drive clutch operable to drive said countershaft gear from said input driver when the first mentioned means is inoperative whereby said stationary gear is driven by said countershaft gear, a second countershaft gear driven from the first mentioned countershaft gear and adapted to mesh with said axially shiftable gear when said sets of clutch teeth are declutched, a third countershaft gear driven from said first mentioned countershaft gear, and a reverse idler shiftable to connect said third countershaft gear and said axially shiftable gear.

3. In a power transmitting mechanism including a torque input driver and a torque output shaft, coaxial gears one axially stationary and the other drivingly mounted on said shaft for axial shift, sets of clutch teeth respectively driven with said coaxial gears adapted for clutching engagement in response to axial shift of said shiftable gear, means operable to establish a direct drive between said input driver and said stationary gear, countershaft gearing means in constant drive relationship with respect to said stationary gear operable to drive the latter from said input driver when said means is inoperative and including an overrunning clutch accommodating operation of the direct drive establishing means, said axially shiftable gear being shiftable to establish drive with said countershaft gearing means when said sets of teeth are declutched, and a reverse idler rotatably stationary when said sets of clutch teeth are in said clutching engagement and shiftable axially to operably connect said axially shiftable gear with said countershaft gearing means.

4. In a power transmitting mechanism including a torque input member and a torque output shaft adapted to be drivingly connected therewith, a set of clutch teeth driven with said member, a pair of coaxial gears, one axially stationary and the other thereof drivingly secured to said shaft and adapted for axial shift, sets of clutch teeth respectively driven with said coaxial gears adapted for clutching engagement in response to axial shift of said shiftable gear, a sleeve driven with said stationary gear and shiftable to clutch with the teeth of said input member whereby to establish a direct drive between said member and said shaft when said sets of teeth are clutched together, countershaft gearing driven from said input member operable to drive said stationary gear when said sleeve is declutched from the first mentioned set of clutch teeth, said shiftable member being shiftable to mesh with said countershaft gearing when said sets of clutch teeth are declutched, a reverse idler rotatably stationary during operation of said direct drive and shiftable to connect said axially shiftable gear and said countershaft gearing when said sets of clutch teeth are declutched, and a one way drive clutch operable to release the drive from said countershaft gearing to said stationary gearing during operation of said direct drive.

5. In a power transmitting mechanism including a torque input member and a torque output shaft, an axially shiftable gear drivingly mounted on said shaft, an axially stationary gear coaxial with said gear, sets of clutch teeth respectively driven from said gears adapted for clutching engagement in response to shift of said axially shiftable gear to establish a direct drive between said stationary gear and said shaft, means operable to establish a direct drive between said input member and said stationary gear, countershaft gearing driven from said input member operable to drive said stationary gear when said means is inoperative to establish the direct drive as aforesaid, said shiftable gear being shiftable to mesh with said countershaft gearing when said sets of teeth are declutched, a reverse idler shiftable to mesh with said countershaft gearing and with said axially shiftable gear, and an overrunning device operable to release said countershaft gearing drive when said means is operable to establish said direct drive.

6. In a power transmitting mechanism including torque input and output members, an axially shiftable gear drivingly secured to said output member, an axially stationary gear coaxial with said gear, means operable in response to shift of said axially shiftable gear for establishing a direct drive between said coaxial gears, means operable to establish a direct drive between said input member and said stationary gear; countershaft gearing including a first gear in constant mesh with said input member, a second gear in constant mesh with said stationary gear, and third and fourth gears, said countershaft gearing being operable to drive said stationary gear when the second mentioned means is inoperative to establish the direct drive as aforesaid; a one-way drive clutch operable to release the drive between said first and second countershaft gears when said second mentioned means is inoperative to establish said direct drive, said shiftable gear being shiftable to mesh with said countershaft third gear when said first mentioned means is inoperative, and an idler shiftable axially to establish a reverse drive between said shiftable gear and said countershaft fourth gear for establishing a reverse drive.

ALAN G. LOOFBOURROW.